Figure 1:
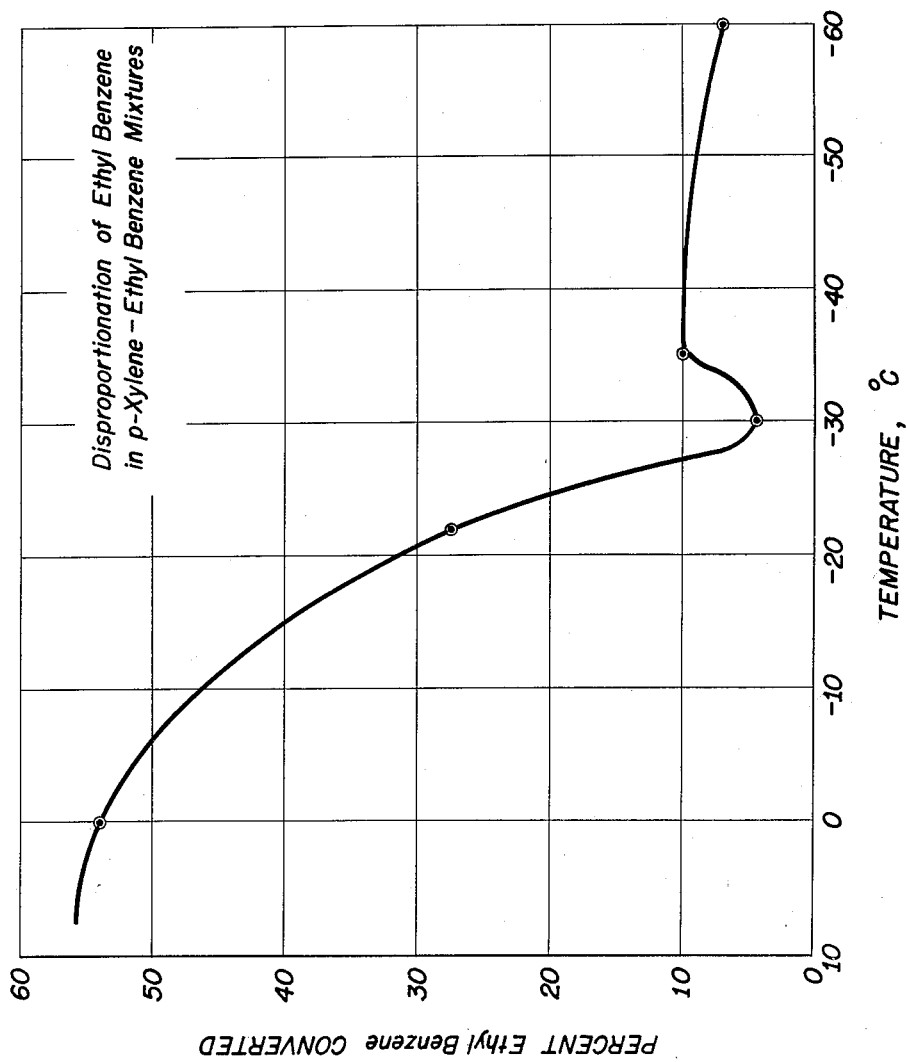

Dec. 27, 1955 D. A. McCAULAY ET AL 2,728,803
SEPARATION OF ETHYLBENZENE FROM OTHER $C_8$ AROMATIC
HYDROCARBONS BY EXTRACTION WITH $HF-BF_3$

Filed Dec. 28, 1951 2 Sheets-Sheet 1

INVENTORS:
David A. McCaulay
Arthur P. Lien
BY
John C. Stauffer
ATTORNEY

Dec. 27, 1955    D. A. McCAULAY ET AL    2,728,803
SEPARATION OF ETHYLBENZENE FROM OTHER C<sub>8</sub> AROMATIC
HYDROCARBONS BY EXTRACTION WITH HF-BF<sub>3</sub>
Filed Dec. 28, 1951    2 Sheets-Sheet 2
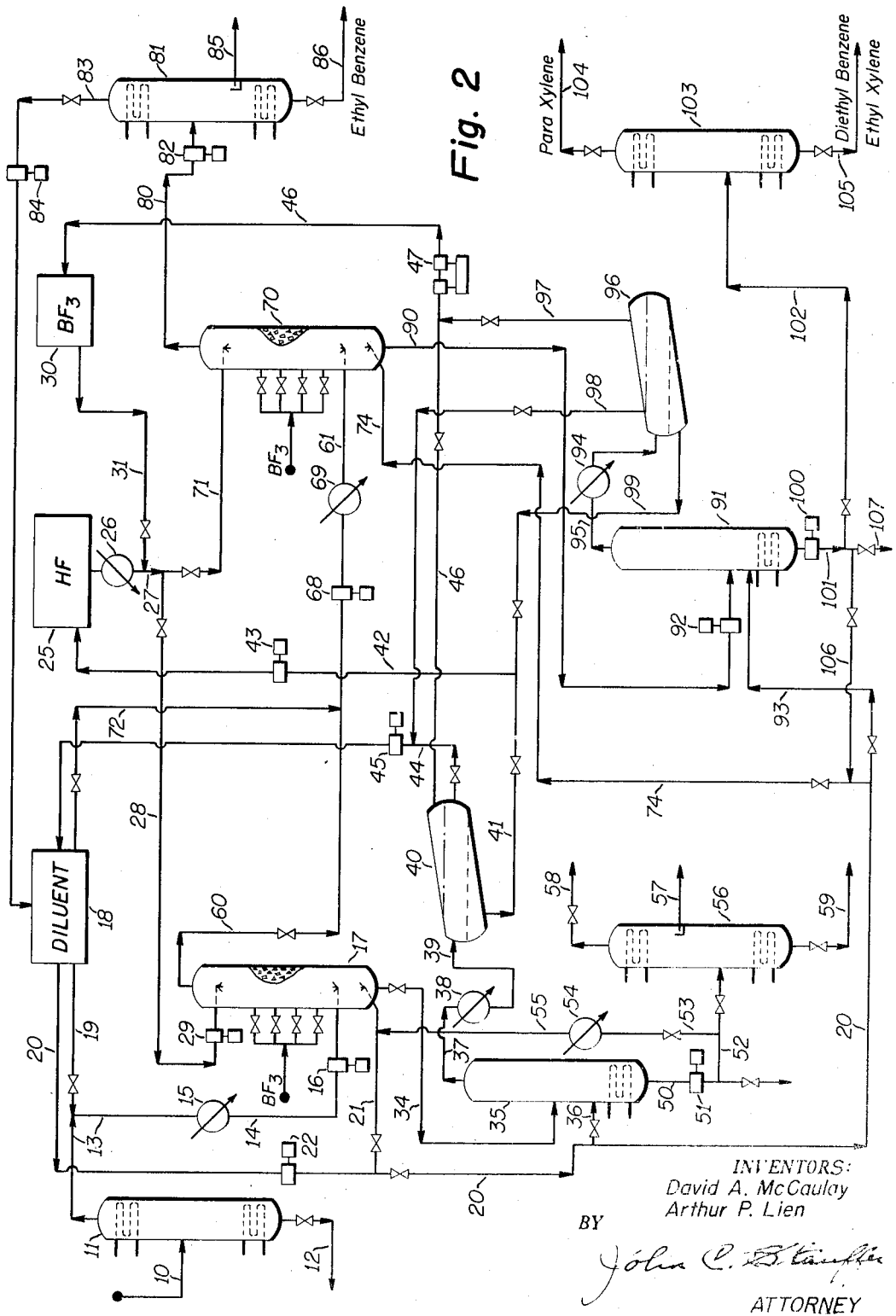
INVENTORS:
David A. McCaulay
Arthur P. Lien
BY
John C. Stauffer
ATTORNEY

United States Patent Office 2,728,803
Patented Dec. 27, 1955

2,728,803

SEPARATION OF ETHYLBENZENE FROM OTHER $C_8$ AROMATIC HYDROCARBONS BY EXTRACTION WITH HF-$BF_3$

David A. McCaulay, Chicago, Ill., and Arthur P. Lien, Highland, Ind., assignors to Standard Oil Company, Chicago, Ill., a corporation of Indiana Application December 28, 1951, Serial No. 263,778

8 Claims. (Cl. 260—674)

This invention relates to the separation of each of the four isomeric $C_8$ aromatic hydrocarbons from naphthas containing nonaromatic hydrocarbons and said $C_8$ aromatic hydrocarbons. More particularly this invention relates to the resolution of mixtures of $C_8$ aromatic hydrocarbons to obtain relatively pure para-xylene and ethylbenzene as separate product streams.

Ethylbenzene has considerable commercial importance as an intermediate for the manufacture of styrene. Para-xylene is likewise of commercial importance, particularly as an intermediate in the manufacture of terephthalic acid and resins therefrom. Hence the separation of these aromatics in relatively pure form from petroleum naphthas and particularly from ortho- and meta-xylene with which they are usually associated is of great importance. It is extremely difficult to separate the $C_8$ aromatics by fractional distillation because of the slight difference in boiling points of the xylenes and ethylbenzene and, in the past, fractional crystallization has been used, particularly for the separation of paraxylene and ethylbenzene. However, it requires repeated recrystallizations to obtain acceptably pure para-xylene and the crystallization methods are in general not adaptable to continuous, large scale operations such as are required in the petroleum and coal tar industries. Mixtures of dimethylbenzenes and ethylbenzene are produced as by-products from the coking of coal. Naphthas derived from certain types of petroleum such as petroleum from the West Texas field are particularly high in $C_8$ aromatic content. Thus a West Texas virgin naphtha may contain in the $C_8$ hydrocarbon fraction as much as 25 to 35 per cent aromatics, of which 50 percent may be ethylbenzene.

The primary object of our invention is to recover ethylbenzene from mixtures containing closely associated $C_8$ aromatic hydrocarbons. Another object of our invention is to obtain relatively pure para-xylene and relatively pure ethylbenzene from mixtures containing $C_8$ hydrocarbons, without substantial loss of para-xylene to less valuable ortho- and meta-xylenes by isomerization. Still another object of our invention is to recover commercial grade ethylbenzene without substantial loss of the ethylbenzenes by way of disproportionation to benzene and diethylbenzene. An additional object of the invention is to incorporate in an integrated solvent extraction process for the separation of $C_8$ aromatics an extraction step for the separation of para-xylene from ethylbenzene. Other objects will be apparent as the description of our invention proceeds.

It has been appreciated heretofore that liquid HF and $BF_3$ function jointly as an extractant for the separation of the xylenes from nonaromatic hydrocarbons. The ortho-xylene may be separated from its isomers by fractional distillation. The remaining isomeric xylenes are separable because of differential stabilities of their complexes with $BF_3$. Thus we have taught such separations in U. S. 2,528,892. In such separations para-xylene appears in the raffinate due to the relative instability of the complex with $BF_3$. Under conditions used heretofore any ethylbenzene present disproportionates to higher and lower boiling aromatics. In fact said disproportionation has been used for separation of para-xylene from ethylbenzene. This separation involves disproportionation of the ethylbenzene in a mixture of these two close-boiling aromatics to $C_{10}$ aromatics and benzene followed by distillative fractionation, by crystallization of the para-xylene or by isomerization of the para-xylene to ortho- and meta-xylene followed by distillative fractionation. These methods lead to a loss of ethylbenzene and a possible loss of para-xylene.

We have now found that a mixture of para-xylene with ethylbenzene can be separated into relatively pure fractions of the component aromatics by use of HF-$BF_3$ extractant, without appreciable loss of para-xylene to meta-xylene and ortho-xylene isomers and without substantial disproportionation of the ethylbenzene to diethylbenzene and benzene. Moreover, the separation may be carried out as an integrated step in the complete resolution of mixtures of xylenes and ethylbenzene into separate streams of relatively pure aromatic components of said mixture.

We have discovered that ethylbenzene and para-xylene form complexes with $BF_3$ in the presence of liquid HF, which complexes have different dissociation constants. This difference in dissociation constants makes possible the separation of a mixture of ethylbenzene and para-xylene into a substantially pure ethylbenzene fraction and a substantially pure para-xylene fraction. Briefly, we have discovered that it is possible to obtain a raffinate phase comprising substantially pure ethylbenzene with respect to aromatic hydrocarbon content, the para-xylene being retained in the extract phase. By close control of operating conditions with respect to temperature, diluent, time of contact and amount of $BF_3$ relative to para-xylene present in the mixture, as described hereinbelow, disproportionation of the ethylbenzene to diethylbenzene and isomerization of para-xylene to ortho- and meta-xylenes can be reduced to a minimum, if not entirely avoided.

The problem of separating two difficultly separable liquids has been investigated extensively in recent years. A particularly good exposition has been made by Colburn and Schoenbarn in Trans. Amer. Inst. Chem. Engrs., 41, 421–443, 645 (1945). The difficulty of separating two liquids is measured by relative volatility for vapor liquid systems and relative distribution ratio for liquid-liquid systems. The separation factor, based on the distribution ratio, which we designate as alpha, may be defined as the quotient obtained by dividing the ratio of the mole fraction of predominant component to mole fraction of the minor component of the extract phase by the ratio of these components in the raffinate phase. Thus $$\alpha = \frac{y_1/y_2}{x_1/x_2}$$

where alpha equals relative distribution ratio, i. e. separation factor, where $y_1$ and $y_2$ equal mole fraction of the two components in the extract phase and where $x_1$ and $x_2$ equal the mole fractions of the components in the raffinate phase. In our process we operate under conditions to obtain a separation factor, alpha, greater than about 5.0.

Colburn et al. also give an approximate method of calculating the number of theoretical stages ($N_p$) needed to obtain fractions of 99 percent purity at a practical reflux ratio according to the equation $$N_p = 18.4/\alpha - 1$$

Normally, a $C_8$ aromatic mixture contains ethylbenzene, orthoxylene, meta-xylene and para-xylene. These boil within the same range, as shown by values given by National Bureau of Standards—C461—November 1947—p. 67.

|  | B. P., °F. | F. P., °F. |
|---|---|---|
| Ortho-xylene | 291.95 | −13.52 |
| Meta-xylene | 282.38 | −54.17 |
| Para-xylene | 281.03 | +55.87 |
| Ethylbenzene | 277.14 | −138.96 |

Although the boiling point spread of 9.5° F. between ortho-xylene and meta-xylene permits separation by superfractional distillation without the use of a prohibitive number of theoretical plates, ethylbenzene, para-xylene and meta-xylene are considered to be nonseparable by fractional distillation. The relative volatility of ethylbenzene and paraxylene is about 1.05, which means that about 370 theoretical plates are necessary for separation of these aromatics by fractional distillation. No solvent extraction system now known can separate $C_8$ aromatics into ethylbenzene, per se, and xylenes.

As stated hereinabove we prefer to operate our paraxylene ethylbenzene separation process in such manner as to take advantage of a separation factor greater than about 5.0 and thereby limit the required number of theoretical stage separations to less than about 4. Conditions of operation which affect this factor are (1) the proportion of $BF_3$ and HF in the mixture relative to para-xylene and ethylbenzene and (2) extent of conversion of ethylbenzene in the contacting stage as affected by temperature, contact time and dilution of the aromatics undergoing extractive separation.

In the step of our process involving extraction of paraxylene from ethylbenzene, we employ closely controlled amounts of $BF_3$ and limit this complexing agent to about one mole of $BF_3$ per mole of para-xylene in the mixture. We prefer to operate within the limits of from about 0.90 to 1.10 moles of $BF_3$ per mole of para-xylene in the mixture although at low contact time, that is below about 5 minutes, as high a ratio as 1.5 may be used in the preferred temperature range. Ethylbenzene is extremely sensitive to the disproportionation reaction, and hence a substantial excess of $BF_3$ must be avoided in order to obtain maximum yields of ethylbenzene. A molar excess of hydrogen fluoride to maintain a liquid medium to contain the para-xylene $BF_3$ complex is preferred. In general we use from about 50 to 300 volume percent of hydrogen fluoride based on the para-xylene content of the mixture. The hydrogen fluoride may be anhydrous or may contain up to about 5 percent water.

The extraction process is carried out in the presence of a diluent such as unreactive hydrocarbons or mixtures of such hydrocarbons, preferably saturated hydrocarbons distilling outside the boiling range of the para-xylene and ethylbenzene, for example paraffinic hydrocarbons having from 2 to 7 carbon atoms per molecule, or mixtures of these. Petroleum fractions containing the $C_8$ aromatic hydrocarbons and associated nonaromatic hydrocarbons as feed to our process may be fed directly to the extractive fractionation process. The nonaromatics are eliminated in admixture with the ethylbenzene fraction and separated therefrom by an added solvent extraction step. Alternatively the source material containing the aromatics may be solvent extracted to obtain a relatively pure aromatic fraction to which an inert hydrocarbon diluent having a boiling range outside that of the $C_8$ aromatics can then be added for carrying out our aromatics separation process. Since our process of separating ethylbenzene from the associated $C_8$ aromatics is carried out at relatively low temperatures, we prefer to use a relatively low-boiling diluent such as propane or normal butane or mixtures of these as diluent, thus to take advantage of cooling effects in flashing diluent from recovered product.

The extraction of para-xylene from ethylbenzene in our process is accomplished at temperatures below about −25° C. but at temperatures sufficiently high to avoid substantial crystallization of para-xylene from the mixture. We have found that at about −60° C. the viscosity of the mixture of aromatics with n-heptane diluent is sufficiently high to necessitate longer settling times than are desirable. These extended settling times result in increased disproportionation of the ethylbenzene to benzene and diethylbenzene due to excess $BF_3$ freed from the complex by the crystallization of para-xylene. Hence we operate our process of ethylbenzene-para-xylene separation within the range of from about −25° C. to about −50° C., preferably within the range of about −30° C. to about −40° C. Thus we prefer to operate in such manner as to avoid more than about 10 percent disproportionation of the ethylbenzene per stage contact with the extractant. The sensitivity of ethylbenzene to such conversion, relative to temperature, is illustrated in Figure 1 which is a plot of ethylbenzene conversion versus temperature of contact with HF-$BF_3$ extractant using five minutes as contact time and allowing fifteen minutes for separation of extract phase from raffinate phase, the relative concentration of $BF_3$ to para-xylene in the mixtures being about equimolar.

Still another important variable in conditions of the operation of our process is time of contact of the mixture of para-xylene and ethylbenzene with the $BF_3$-containing extractant. Intimate mixing at times of contact in excess of ten minutes is highly undesirable, particularly wherein the $BF_3$ concentration is in substantial excess of 1.1 mole per mole of para-xylene in the mixture and if the temperature of contact is higher than about −30° C. We prefer to operate at contact times not in excess of five minutes and at overall contact time plus phase separation time, i. e., settling time, not in excess of twenty minutes. Overall intimate contact times may be controlled by the use of suitable mixing devices such as knot-hole mixers, agitators, homogenizers, etc., well known to those skilled in the art, suitably integrated in operation with separating devices such as centrifugals to promote rapid separation of the raffinate from the HF-$BF_3$ extractant phase the keep total contact time well within the above limits.

The data in Table I below were obtained in a series of experiments to ascertain the effect of temperature and $BF_3$ concentration, as well as contact time, on the disproportionation of ethylbenzene. Mixtures of ethylbenzene and para-xylene in n-heptane diluent were separated by means of HF-$BF_3$ extractant. In these experiments a 1570 ml. capacity carbon steel reactor, fitted with a 1725 R. P. M. mechanical stirrer and a cooling coil, was charged with a mixture of the aromatics, heptane diluent and HF, and the mixture was then chilled to the temperature desired for contacting. The $BF_3$ was then added to the stirred mixture at a rate such that no temperature increase took place. Stirring was continued to provide the overall contact periods as indicated in Table I, i. e., usually an overall contact period of five minutes. Settling times, of fifteen minutes in most of these experiments, were sufficient to give complete phase separation. The extract phase and the raffinate phase were then freed of extractant and diluent and analyzed by ultraviolet absorption, total volume of said phases being measured to determine distribution of the components thereof as a result of contact with the HF-$BF_3$ extractant. The amounts of aromatics and $BF_3$ are expressed as moles; the diluent and HF as grams in Table I.

Table I

| Experiment | 1 | 2 | 3 | 4 | 5 | 6 | 7 |
|---|---|---|---|---|---|---|---|
| Charge: | | | | | | | |
| p-Xylene, moles | 0.4 | 0.4 | 0.4 | .393 | .598 | .80 | .81 |
| Ethylbenzene, moles | 0.4 | 0.4 | 0.4 | .405 | .608 | .81 | .81 |
| n-Heptane, g | 69 | 68 | 69 | 68.5 | 101.5 | 136 | 135 |
| HF, g | 198.5 | 207.5 | 204.5 | 188.5 | 301.5 | 400 | 400 |
| $BF_3$, moles | 0.35 | 0.38 | .6 | .36 | .677 | .85 | 1.0 |
| Operating Conditions: | | | | | | | |
| Temp., °C | 0 | −22 | −35 | −35 | −36 | −30 | −60 |
| Mixing time, Min | 5 | 5 | 5 | 5 | 15 | 15 | 15 |
| Settling Time, Min | 10 | 15 | 10 | 10 | 30 | 45 | 45 |

| | Raff. | Extr. | Raff. | Extr. | Raff. | Extr. | Raff. | Extr. | Raff. | Extr. | Raff. | Extr. | Raff. | Extr. |
|---|---|---|---|---|---|---|---|---|---|---|---|---|---|---|
| U. V. Analysis of $C_8$, percent: | | | | | | | | | | | | | | |
| m-Xylene | | | | | | | 0.7 | 3.0 | 2 | 10 | 0.6 | 3.0 | 0.2 | 2.7 |
| p-Xylene | | | | | | | 42.8 | 83.2 | 42 | 80 | 40.7 | 77.0 | 42.4 | 61.5 |
| Ethylbenzene | | | | | | | 56.5 | 13.8 | 56 | 10 | 58.7 | 20.0 | 57.4 | 35.8 |
| Product Distribution (moles): | | | | | | | | | | | | | | |
| Benzene | .098 | 0 | 0.05 | 0 | .019 | 0 | .023 | 0 | .062 | .033 | .058 | .008 | .064 | (1) |
| $C_8$ Aromatics | .46 | .119 | .49 | .19 | .478 | .288 | .558 | .192 | .677 | .306 | 1.07 | .445 | .934 | .014 |
| m-Xylene | | | | | | | .004 | .006 | .014 | .030 | .006 | .013 | .002 | .404 |
| p-Xylene | | | | | | | .239 | .160 | .284 | .245 | .436 | .343 | .396 | .011 |
| Ethylbenzene | | | | | | | .315 | .026 | .379 | .031 | .628 | .089 | .536 | .248 |
| $C_{10}$ Aromatics | 0 | .119 | 0 | 0.06 | 0 | .019 | 0 | .027 | 0 | .125 | 0 | .040 | 0 | .145 |
| Diethylbenzene | 0 | .119 | 0 | 0.06 | | .019 | 0 | .027 | 0 | .12 | 0 | .040 | 0 | .082 |
| Ethylxylene | | | | | | | | | 0 | .015 | | | | .082 |
| Total | .558 | .238 | .54 | .25 | .497 | .307 | .581 | .219 | .739 | .464 | 1.128 | .493 | .998 | .500 |

| | | | | | | | |
|---|---|---|---|---|---|---|---|
| Disproportionation, Percent of Total Aromatics | 27 | 13.8 | 4.7 | 6.2 | 18 | 6.5 | 10 |
| Percent Ethylbenzene Converted | 54 | 27.5 | 9.5 | 12.5 | 36 | 13 | 20 |
| Alpha, p-Xylene/Ethylbenzene | | | | 8 | 11 | 5.5 | 2.3 |

[1] 0.122 mole para-xylene obtained as liquid from reactor after coming to room temperature.

Experiments 1 and 2 show that even with mole ratios of $BF_3$ to para-xylene slightly less than one-to-one and with overall contact times held within the twenty minute limitation, considerable disproportionation of ethylbenzene takes place if contacting is carried out above about −25° C. On the other hand, if the contacting temperature is lowered to −30° C. (Experiment 6) with a $BF_3$ to para-xylene mole ratio of about 1.06, longer contact times may be tolerated and avoidance of excessive loss of ethylbenzene to diethylbenzene is realized; furthermore, a relatively high alpha value is obtainable. However, if the temperature of contacting is lowered still further to −35° C. the conversion of ethylbenzene per unit time increases slightly because at these temperatures some of the para-xylene crystallizes out and the concentration of uncomplexed $BF_3$ is increased. Nevertheless, high separation factors, alpha, are obtainable if low overall contact times are maintained. The effect of a too high $BF_3$ concentration is demonstrated further in Experiment 7, which was carried out at −60° C. In this experiment crystallization of a large part of the para-xylene occurred, thus increasing the effective concentration of $BF_3$, which in turn promoted conversion of the ethylbenzene even at this extremely low temperature. The results indicate that ethylbenzene in high purity can be separated from para-xylene under certain conditions without substantial loss by way of disproportionation. For example, use may be made of a multistage extraction process, with HF-$BF_3$ extractant, wherein the necessary stages are not greater than about four. An extraction process corresponding to three or less theoretical stages may be used if conditions of temperature, $BF_3$, diluent and time of contact are adjusted to minimize ethylbenzene degradation to benzene and diethylbenzene.

The results of experiments involving mixtures of ethylbenzene with meta-xylene, with ortho-xylene and with equimolar quantities of meta- and para-xylene are tabulated in Table II.

Table II

| Experiment | 8 | 9 | 10 | 11 |
|---|---|---|---|---|
| Charge: | | | | |
| o-Xylene, moles | | | .39 | |
| m-Xylene, moles | .604 | 0.4 | | .82 |
| p-Xylene, moles | | | | .81 |
| Ethylbenzene, moles | .609 | 0.41 | .40 | .81 |
| n-Heptane, g | 100.5 | 68.5 | 67 | 206 |
| HF, g | 296 | 200 | 204 | 600 |
| $BF_3$, moles | .59 | 0.33 | .43 | 2.68 |
| Operating Conditions: | | | | |
| Temp., °C | −35 | 0 | −32 | 24 |
| Mixing Time, Min | 5 | 5 | 5 | 30 |
| Settling Time, Min | 15 | 10 | 10 | 10 |

| | Raff. | Extr. | Raff. | Extr. | Raff. | Extr. | Raff. | Extr. |
|---|---|---|---|---|---|---|---|---|
| U. V. Analysis of $C_8$, Percent: | | | | | | | | |
| o-Xylene | | | | | 20 | 90 | | |
| m-Xylene | 2.5 | 80 | 16.9 | 85.3 | | | 7 | 85 |
| p-Xylene | 6.5 | 2 | 7.4 | 1.6 | | | 47 | 9 |
| Ethylbenzene | 91 | 18 | 75.7 | 13.1 | 80 | 10 | 46 | 6 |

Table II.—Continued

|  | Raff. | Extr. | Total | Raff. | Extr. | Total | Raff. | Extr. | Total | Raff. | Extr. | Total |
|---|---|---|---|---|---|---|---|---|---|---|---|---|
| Product Distribution (moles): |  |  |  |  |  |  |  |  |  |  |  |  |
| Benzene | 0 | 0 | 0 | .044 | 0 | .044 | .0034 | 0 | .0034 | 0.12 | 0.10 | 0.22 |
| C₈ Aromatics | .61 | .60 | 1.21 | .421 | .323 | .744 | .47 | .32 | .79 | 0.79 | 1.23 | 2.02 |
| o-Xylene | 0 | 0 | 0 |  |  |  | .094 | .288 | .382 |  |  |  |
| m-Xylene | 0.015 | .480 | 0.50 | .071 | .276 | .347 |  |  |  | .06 | 1.05 | 1.11 |
| p-Xylene | 0.039 | .012 | .05 | 0.31 | .005 | .036 |  |  |  | .37 | .11 | .48 |
| Ethylbenzene | .556+ | .108 | .66 | .319 | .042 | .361 | .376 | .032 | .408 | .36 | .07 | .43 |
| Total | .61 | .60 | 1.21 | .465 | .351 | ¹.816 | .473 | ².323 | .797 | .91 | ³1.52 | 2.43 |
| Disproportionation, Percent of Total Aromatics |  |  |  |  | 8.8 |  |  | 0.9 |  |  |  |  |
| Percent Ethylbenzene Converted |  | 0 |  |  | 12.2 |  |  | 1.8 |  |  | 50 |  |
| Percent Xylene Conversion to Ethylxylene |  | 0 |  |  | 5.6 |  |  | 0 |  |  | Ca. 2 |  |
| Percent p-Xylene Isomerized |  | 0 |  |  | 0 |  |  | 0 |  |  | 41 |  |
| Alpha, o-Xylene/Ethylbenzene |  |  |  |  |  |  |  | 36 |  |  |  |  |
| Alpha, p-Xylene/Ethylbenzene |  |  |  |  |  |  |  |  |  |  | 1.5 |  |
| Alpha, m-Xylene/Ethylbenzene |  | 162 |  |  | 29 |  |  |  |  |  | 93 |  |

¹ .028 mole diethylbenzene in extract.
² .003 mole diethylbenzene.
³ Includes 0.19 mole C₁₀ aromatics.

These experiments were carried out in the same apparatus and in the same manner as described above for obtaining the data in Table I. Comparison of Experiment 8 with Experiment 9 shows that an extremely high separation factor with reference to meta-xylene and ethylbenzene can be realized if the operation is carried out at low temperatures and if the concentration of BF₃ is approximately one mole per mole of meta-xylene. Thus in Experiment 8 a separation factor of 162 was obtained at −35° C. and at approximately one mole of BF₃ per mole of meta-xylene; on the other hand, in Experiment 9 at 0° C. and at 0.8 mole BF₃ per mole of xylene a separation factor of only 29 was obtained. Notwithstanding the low BF₃ concentration, the higher temperature of contact was sufficient to cause a conversion of 12.2% of the ethylbenzene to benzene and diethylbenzene. Comparison of Experiment 8 with Experiment 10, which were carried out a substantially the same conditions of temperature, contact time and concentration of BF₃, indicates that the separation factor using the HF-BF₃ extractant is considerably more favorable for the meta-xylene-ethylbenzene system than for the ortho-xylene-ethylbenzene system.

In Experiment 11 a mixture of equimolar portions of meta- and para-xylene with ethylbenzene was contacted with HF-BF₃ at 24° C. for a period of 30 minutes. Although the concentration of BF₃ was 65 percent in excess of that required to complex the meta- and para-xylenes, nevertheless the major part of the para-xylene appeared in the raffinate phase, apparently because of the instability of the para-xylene-BF₃ complex at the high contact temperature. Conversion of ethylbenzene and isomerization of para-xylene were high.

An illustrative flow diagram concerning the extraction process of this invention is presented in Figure 2. The operation of the flow diagram is described with reference to the separation or concentration of the individual xylene components and the ethylbenzene component of a C₈ aromatic fraction from a petroleum naphtha which is substantially free of nonaromatic components boiling in the xylene boiling range, i. e. from about 130° C. to about 165° C. Highly aromatic fractions are produced in catalytic processes such as hydroforming and catalytic cracking. As indicated hereinabove, one source of C₈ aromatics is from virgin naphtha of a West Texas crude. The concentration of the aromatic fraction for feed to our process may be accomplished by a presolvent extraction process for the separation of the aromatics from the nonaromatic components. A representative "xylene fraction" from hydroformate will contain about 20 percent ortho-xylene, 42 percent meta-xylene, 18 percent para-xylene and 20 percent ethylbenzene. Such a fraction is suitable as feed to our process.

With reference to Figure 2, the feed, consisting substantially of ortho-xylene, meta-xylene, para-xylene and ethylbenzene, is passed through line 10 to superfractionator 11 wherein ortho-xylene is separated from the other C₈ aromatic compounds by distillative fractionation and is withdrawn as a bottoms fraction through line 12. Overhead product consisting of meta-xylene, para-xylene, ethylbenzene and nonseparated ortho-xylene, if any, is passed through lines 13 and 14 and chilling means 15 by means of pump 16 for introduction at a low point into extraction tower 17. Tower 17 may be packed with shaped solid material resistant to HF and BF₃, such as carbon, copper or Monel metal. Diluent, for example propane, from diluent accumulator 18, is introduced to the stream of aromatics through line 19. A part of the diluent may be passed through lines 20 and 21 to extraction tower 17 by means of pump 22 to aid in stripping noncomplexed aromatics from the descending meta-xylene-BF₃ complex and ortho-xylene-BF₃ complex, if any, as described below. We prefer to use about equal volumes of diluent and charging stock to tower 17 but we may use from about 0.2 to 5.0 volumes of diluent per volume of charging stock.

Liquid hydrogen fluoride in HF accumulator 25 is passed via line 27 through cooler 26 and thence via line 28 by pump 29 and is introduced into tower 17 at an elevated point in tower 17. Boron fluoride from accumulator 30 is passed to the HF stream in line 27 through line 31. Boron fluoride is also added directly to tower 17 at a multiplicity of points in the extract phase to insure complete complex formation with meta-xylene and ortho-xylene. We prefer to use anhydrous HF in order to minimize hydrolysis of the BF₃, but the HF may contain up to 5 percent by weight of water. Excess hydrogen fluoride, i. e. from about 5 to about 30 moles per mole of xylenes in the charge stock, is used to provide a liquid medium comprising the complex of meta- and ortho-xylenes with HF and BF₃. The total BF₃ introduced to tower 17 should not exceed one mole of BF₃ per mole of meta-xylene and ortho-xylene together since it is highly undesirable to have any free BF₃ present.

The extraction in tower 17 is conducted in such manner that two immiscible phases are present therein, viz., a lower extract phase and a supernatant raffinate phase. The operations are conducted in such a manner as to effect the removal of substantially all of the meta-xylene and any residual ortho-xylene into the extract phase while permitting para-xylene, ethylbenzene and diluent to constitute the raffinate phase. In order to carry out efficiently the separation without substantial complexing of BF₃ with para-xylene and to avoid disproportionation of the ethylbenzene, low temperatures are maintained in tower 17. Thus we operate tower 17 at temperatures below −20° C. and preferably below about −25° C. Heat produced by complex formation is withdrawn by the circulation of a coolant through cooling coils installed in tower 17 (not shown in the drawing).

The extract phase is withdrawn from tower 17 through line 34 and is passed to stripper 35 for decomposition of the complexed meta-xylene and ortho-xylene and for recovery of diluent, HF and $BF_3$ as overhead products. If desired, diluent from line 20 may be passed via line 36 to stripper 35 to aid in the stripping operation. Overhead product passes through line 37, condenser 38 and line 39 to settler 40, wherein separation is effected with liquid HF as a lower liquid phase, diluent as a supernatant liquid phase, and $BF_3$ as a gaseous phase. The HF is passed by lines 41 and 42 to accumulator 25 by means of pump 43; diluent is returned to accumulator 18 through line 44 by pump 45; and $BF_3$ is returned to accumulator 30 via line 46 by compressor 47.

The aromatic bottoms product from stripper 35 consists essentially of meta-xylene. However, if separation of ortho-xylene in fractionator 11 is not complete, the bottoms may contain a minor amount of ortho-xylene. In addition, any disproportionation of ethylbenzene in extractor 17 produces benzene and diethylbenzene and hence the bottom product may contain some diethylbenzene. The aromatic bottom product is withdrawn through line 50 by means of pump 51 and, if of the desired purity with respect to meta-xylene, it is sent to storage. A part of the product may be recycled via lines 52 and 53, cooler 54, and lines 55 and 21 to extractor 17. Alternately, the product in line 50 may be sent via line 52 to fractionation system 56 whence meta-xylene may be recovered as a side stream in line 57 substantially free of ortho-xylene, benzene, and diethylbenzene, any benzene being taken overhead through line 58, a mixture of ortho-xylene and diethylbenzene being withdrawn as bottoms through line 59.

The overhead raffinate from extractor 17 is passed by means of pump 68 through lines 60 and 61 and cooler 69 to extractor 70 wherein para-xylene is separated from ethylbenzene by contacting the raffinate with controlled amounts of the HF-$BF_3$ extractant introduced to tower 70 through line 71. Propane diluent from accumulator 18 may be added to the stream in line 61 through line 72. Diluent is also introduced to the extract phase in tower 70 by means of line 74 which leads from line 20. At least a part of the $BF_3$ complexing agent is introduced at a multiplicity of levels in extraction tower 70. Tower 70 is packed with shaped solid material resistant to HF and $BF_3$, such as carbon, copper or Monel metal. Provision should also be made for cooling the contents of the tower by passing coolant through coils within the tower (not shown in the drawing).

Tower 70 is operated under conditions to obtain an extract phase consisting to the minor part of the HF-$BF_3$ extractant as the medium containing para-xylene and a minor amount of diethylbenzene. A trace of ethylxylene may also be present in the extract phase. Temperature of the tower contents should not exceed $-25°$ C. and we prefer to operate within the temperature range of $-30$ to $-40°$ C., for example $-35°$ C. in tower 70. The total amount of $BF_3$ in tower 70 operation should be within the range of 0.90 to 1.10 moles per mole of para-xylene in the mixture undergoing extraction. The amount of HF should be sufficient to provide a liquid medium for carrying the para-xylene and diethylbenzene and ethylxylene by-products, which ethylxylene by-product may be formed in amounts not greater than a trace in our process. In general, 50 to 300 volume percent HF based on the para-xylene in the mixture are required. The amount of light hydrocarbon diluent, i. e. propane, should be within the range of 0.5 to 5.0 volumes per volume aromatic hydrocarbon stock entering tower 70 through line 61. The time of contact of the mixture in tower 70 should not exceed five minutes and preferably not more than two minutes since the disproportionation of ethylbenzene to benzene and diethylbenzene is, in general, proportionate to the contact time. Tower 70 may be constructed and operated to give, in effect, the equivalent of four or five stages of extraction or, if desired, more than one tower may be used to obtain this number of stages to obtain a raffinate of the desired parity with respect to ethylbenzene.

Raffinate from tower 70 passes overhead through line 80 and is introduced into fractionator 81 by means of pump 82. In fractionator 81 diluent and any residual HF and $BF_3$ are taken overhead and are recycled via line 83 by means of pump 84 to accumulator 18. Benzene by-product from a minor amount of disproportionation of the ethylbenzene is withdrawn as a side stream through line 85 and ethylbenzene is withdrawn from fractionator 81 as bottom product through line 86.

The extract phase from tower 70 is withdrawn through line 90 and is passed to stripping tower 91 by means of pump 92. Additional propane diluent is introduced to tower 91 through line 93 to aid in removing HF and $BF_3$ from the extract. Temperatures in stripper 91 should not exceed about $66°$ C., thus to avoid the isomerization of para-xylene in the concentrate. Overhead from tower 91 is condensed by means of cooler 94 in line 95 and passes to settler 96 wherein three phases are formed, that is, a gaseous $BF_3$ phase which is returned to $BF_3$ accumulator 30 via lines 97 and 46, a diluent phase (liquid) which is returned to diluent accumulator 18 via lines 98 and 44, and a liquid HF phase whence HF is returned to HF accumulator 25 via lines 99 and 42.

The bottoms from stripper 91 are removed by means of pump 100 in line 101 and pass via line 102 to fractionator 103 whence para-xylene is removed as overhead product through line 104 and whence by-product diethylbenzene and ethylxylene are removed as bottom product through line 105. A part of the bottom product from stripper 91 may be recycled to extractor 70 through lines 106 and diluent line 74, if desired, in order to obtain more complete separation of ethylbenzene from the para-xylene stream. Where the operation of extraction tower 70 has been sufficiently close to optimum conditions with respect to temperature, $BF_3$ concentration, and contact time, there may be only minor amounts of by-product diethylbenzene and ethylxylene contaminants in the para-xylene product from stripper 91, in which case the product may be withdrawn through line 107, thus omitting further purification by distillative fractionation in tower 103.

Although Figure 2 describes a continuous extraction operation, the process of our invention can be operated batchwise. This is particularly true of the primary extraction step wherein meta-xylene is separated from para-xylene and ethylbenzene since, as indicated above, relatively large separation factors are involved and these require only a single stage extraction. The process can be operated in a plurality of stages employing either batch or continuous extraction equipment. Various types of contacting equipment may be used in lieu of packed towers, for example (1) agitated autoclaves or the like in combination with settling drums, or (2) a pipe coil wherein HF, $BF_3$ and charging stock are concurrently contacted at high velocity and discharged into a settling chamber, or (3) venturi mixers operated in conjunction with settler systems. Extraction and phase separation may be conducted in a centrifuge, thus limiting contact time to a minimum and reducing the disproportionation of the ethylbenzene to the vanishing point when operating within the preferred temperature range and with substantially no excess $BF_3$ above the 1:1 mole ratio of $BF_3$ to meta-xylene or para-xylene undergoing complex formation. The above and other known means of contacting employed in solvent extraction processes and in processes wherein liquid catalysts are contacted with hydrocarbons may be employed to practice the process of our invention.

When the recovery of HF and $BF_3$ as such is not required, as in small scale operation, the stripping operations as described in Figure 2 (towers 35 and 91) may be dispensed with. As an alternative to stripping of the extract phase, said phase may be mixed with water, alkaline or acid solutions or the like which dissolve HF and BF$_3$ leaving a supernatant hydrocarbon phase which may be recovered. A desirable acidic solution with which to treat the extract phase is the azeotropic HF-H$_2$O solution, which becomes enriched in HF upon contact with the extract phase and from which the HF in excess of the azeotropic amount can thereafter be recovered readily by distillation. Still another alternative would be to distill free HF from the extract phase, following which the residual firmly bound BF$_3$-HF-xylene complex could be treated with water or aqueous alkaline or acidic solutions to liberate xylenes bound in solid complex. Such method may be used to separate para-xylene from the extract obtained from tower 70, thus avoiding temperatures sufficiently high to cause isomerization of the para-xylene in the presence of BF$_3$.

Having thus described our invention, what we claim is:

1. In a process for separating ethylbenzene from dimethylbenzenes in a feed comprising ethylbenzene and at least one dimethylbenzene by means of an extractant consisting of HF and BF$_3$, the improvement which comprises adjusting the concentration of BF$_3$ in said extractant to correspond to not less than 0.9 mole and not more than 1.5 mole of BF$_3$ per mole of total dimethylbenzenes in said feed, contacting said feed with said extractant at a temperature within the range of from about $-25°$ C. to about $-50°$ C. for a period not in excess of about five minutes and separating the contact mixture to obtain an extract containing substantially all of the dimethylbenzene and raffinate containing the major part of the ethylbenzene.

2. The improvement as described in claim 1 wherein the temperature of contacting said feed with said extractant is within the range of from about $-30°$ C. to about $-40°$ C., and wherein the BF$_3$ concentration in said extractant is not less than 0.9 mole and not more than 1.1 moles of BF$_3$ per mole of total dimethylbenzenes in said mixture of aromatics.

3. The process as described in claim 1 wherein the feed is comprised essentially of meta-xylene, para-xylene, and ethylbenzene.

4. A process for separating ethylbenzene from a mixture of hydrocarbons containing aromatic hydrocarbons consisting essentially of ethylbenzene and para-xylene by means of an extractant mixture of HF and BF$_3$ under conditions of temperature, concentration of BF$_3$ and contact time of said extractant mixture with said mixture containing ethylbenzene and para-xylene to obtain a separation factor of at least 5.0 relative to separation of said para-xylene from said ethylbenzene which process comprises contacting the mixture of para-xylene and ethylbenzene with said extractant mixture of HF and BF$_3$, said BF$_3$ being present in an amount within the range of 0.90 and 1.10 moles per mole of para-xylene in the mixture with ethylbenzene, said contact of extractant with the para-xylene-ethylbenzene mixture being limited to not more than five minutes, said contact being made at a temperature within the range of from about $-25°$ C. to about $-50°$ C., and separating a raffinate phase containing the major portion of the ethylbenzene from the extract phase containing the major portion of the para-xylene.

5. The process of claim 4 wherein the operation of contacting extractant with a mixture of para-xylene and ethylbenzene is carried out in a multiplicity of stages, not exceeding four, to recover a major part of the ethylbenzene in the feed to the process.

6. The process of claim 4 wherein the temperature of contact is within the range of $-30°$ C. and $-40°$ C.

7. A process for the separation of ethylbenzene from dimethylbenzene in a mixture of saturated hydrocarbons and C$_8$ aromatics comprising essentially ethylbenzene, para-xylene, and meta-xylene which comprises the steps of (1) contacting said mixture with an extractant mixture of HF and BF$_3$ in which the molar concentration of BF$_3$ is adjusted to the range of about 0.9 to about 1.1 moles per mole of metaxylene in said mixture, said contacting being for a period not in excess of about five minutes and at a temperature in the range of from about $-25°$ C. to about $-50°$ C. under contacting conditions to produce an extract phase comprised essentially of meta-xylene in HF-BF$_3$ extractant and a raffinate phase comprising essentially para-xylene, ethylbenzene, and said saturated hydrocarbons, (2) separating the raffinate phase from the extract phase and passing said raffinate phase to a second contacting step wherein contact of said raffinate phase is made with an extractant mixture of HF with BF$_3$ in which the concentration of BF$_3$ is adjusted to the range of about 0.9 to about 1.1 moles per mole of para-xylene in said raffinate phase, said contact of said raffinate being made at a temperature within the range of from about $-30°$ C. to about $-40°$ C. for a period not in excess of about five minutes to produce a secondary extract containing the major part of the para-xylene and a secondary raffinate containing said saturated hydrocarbons and the major part of the ethylbenzene from the feed to step 1 of the process, and (3) recovering para-xylene from the extract of step 2.

8. A process for the recovery of ethylbenzene and para-xylene from a feed consisting essentially of a mixture of C$_8$ aromatic hydrocarbons comprising essentially ethylbenzene, para-xylene, and at least one xylene selected from the class consisting of ortho-xylene and meta-xylene which comprises the steps of (1) contacting said mixture with an extractant mixture of HF and BF$_3$ in which the molar concentration of BF$_3$ is adjusted to the range of about 0.9 to about 1.1 moles per mole of xylene other than para-xylene in said mixture, said contacting being made for a period not in excess of about five minutes and at a temperature in the range of from about $-25°$ C. to about $-50°$ C. under contacting conditions to produce an extract phase comprised essentially of xylene, other than para-xylene, in HF-BF$_3$ extractant and a raffinate phase comprised essentially of para-xylene and ethylbenzene, (2) separating the raffinate phase from the extract phase and passing said raffinate phase to a second contacting step wherein contact of said raffinate phase is made with an extractant mixture of HF with BF$_3$ in which the concentration of BF$_3$ is adjusted to the range of about 0.9 to about 1.1 moles per mole of para-xylene in said raffinate phase, said contact of said raffinate being made at a temperature within the range of from about $-30°$ C. to about $-40°$ C. for a period not in excess of about five minutes to produce a secondary raffinate phase and a secondary extract phase containing the major part of said para-xylene from the feed to step 1 of the process, (3) recovering para-xylene from the secondary extract of step 2, and (4) recovering ethylbenzene from the secondary raffinate phase of step 2 of the process.

References Cited in the file of this patent

UNITED STATES PATENTS

| | | |
|---|---|---|
| 2,398,526 | Greenburg | Apr. 16, 1946 |
| 2,521,444 | Brooke et al. | Sept. 5, 1950 |
| 2,528,892 | Lien et al. | Nov. 7, 1950 |
| 2,528,893 | Lien et al. | Nov. 7, 1950 |